Figure 1:
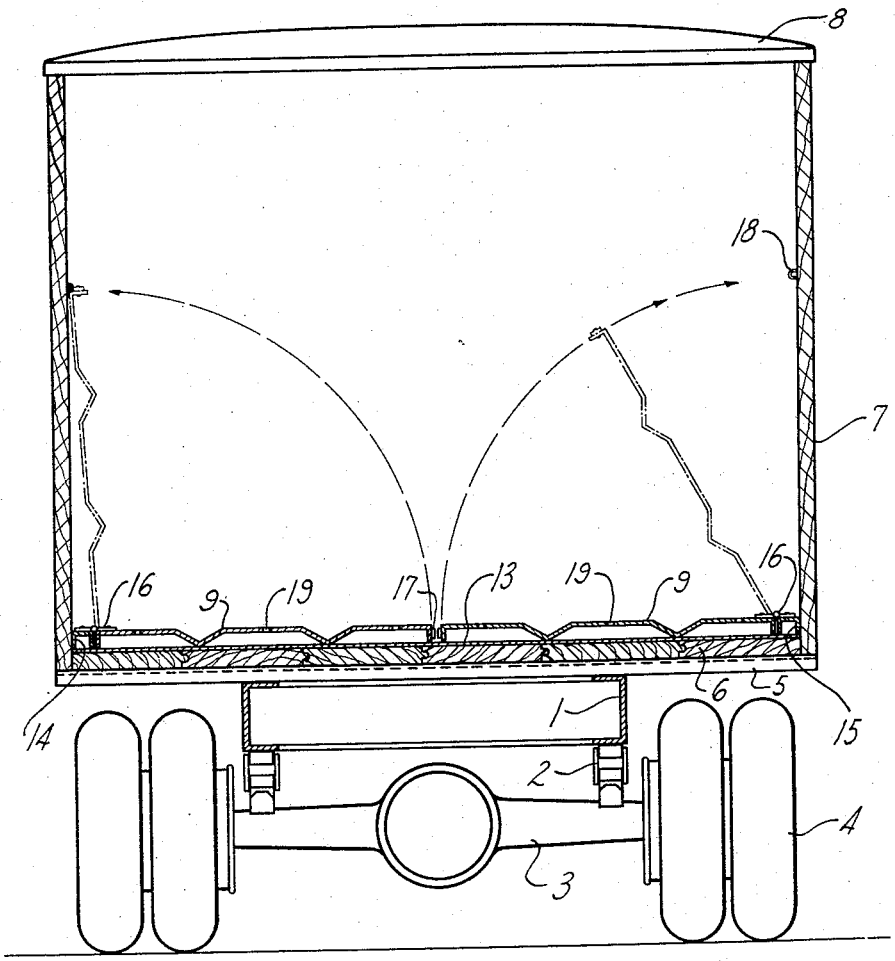

Jan. 20, 1959 M. A. TORBIN 2,869,920

FLOOR RACKS FOR MEAT TRUCKS

Filed July 27, 1956

INVENTOR.
M. Alfred Torbin
BY William D. Jaspert
Attorney.

2,869,920

FLOOR RACKS FOR MEAT TRUCKS

Milton Alfred Torbin, Pittsburgh, Pa.

Application July 27, 1956, Serial No. 600,611

2 Claims. (Cl. 296—24)

This invention relates to new and useful improvements in truck bodies, more particularly to the use of floor racks in truck bodies for holding food stuffs, and it is among the objects thereof to provide racks for truck bodies which are constructed of metal, preferably of the non-corroding types such as aluminum alloy or stainless steel, and which can be washed down and scrubbed to maintain a highly sanitary, germ free supporting floor structure.

It is a further object of the invention to provide a rack construction for trucks in which the rack members are hinged in a manner to be moved out of place and latched against the wall of the truck body.

Figure 2:
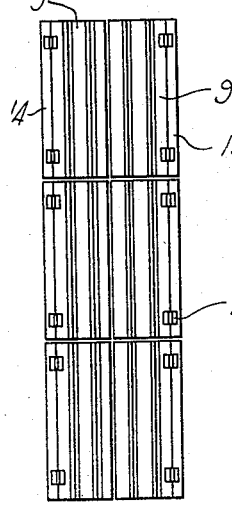
Figure 3:
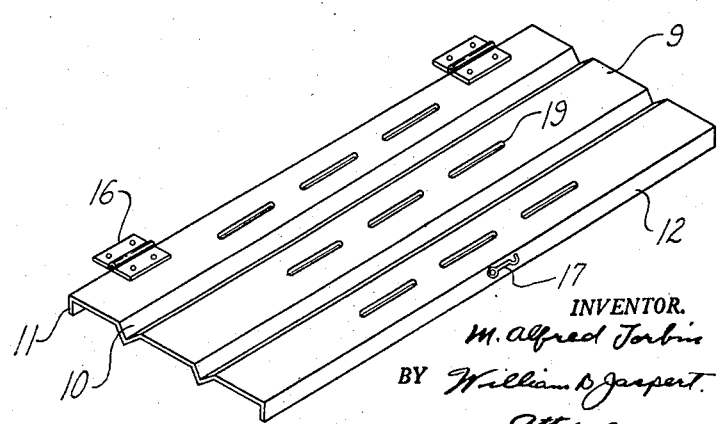

These and other objects of the invention will become more apparent from a consideration of the accompanying drawing constituting a part hereof in which like reference characters designate like parts and in which:

Figure 1 is a rear end view of a truck body equipped with a hinged rack embodying the principles of this invention;

Figure 2, a top plan view of a complete rack assembly in a truck body; and,

Figure 3, a view in perspective of a hinge unit of the rack construction.

With reference to the several figures of the drawing, the numeral 1 designates a chassis frame supported by springs 2 on a wheel axle 3 having rubber tired wheels 4.

A truck body comprising angles or channels 5 is mounted on the chassis 1, the angles 5 being secured to the chassis by bolts or by welding, and a floor structure 6 is supported on the cross channels 5 in the manner shown. The panel 7 of the truck is likewise mounted on the channels or angles 5 and is provided with a roof member 8 in the conventional manner.

In accordance with the present invention, a rack 9, Figure 3, which may be pressed of sheet metal such as aluminum or stainless steel with V grooves 10 pressed into the top surface thereof and having chairs 11 and 12 in the form of depending flanges which are of substantially the depth of the V grooves so that the latter also function as legs or chairs, are mounted on the truck floor 6, or as shown in Figure 1, on a sheet metal sub-floor 13 for easy cleaning purposes. Provided along the inner walls of the truck body are inverted channel-shaped members 14 and 15 of the same height as the rack structure 9, the rack being connected to the channels by means of hinges 16. The racks are assembled in pairs arranged in tandem, as shown in Figure 2, to cover the entire floor of the truck and the racks are provided with latches 17 that engage eyes 18 screwed into the truck panels to hold the racks in the raised position, as shown on the lefthand side of Figure 1 of the drawing.

By using the channels 14 and 15, suitable supports are provided for the hinges 16 and the racks are spaced a proper distance from the panel of the truck body to avoid accumulation of materials behind the racks that might interfere with lifting the racks. Slots 19 may be provided throughout the rack surfaces to maintain circulation of air and to aid in draining off the surface water when the rack structures and the truck floor are hosed down.

The above rack type floor construction is especially useful in meat trucks which must be maintained in a sanitary condition. By the use of the metal racks, the floor can be scrubbed down and hosed down, and by having all of the racks in the raised position, as shown on the lefthand panel of Figure 1 of the drawing, the metal-sub-floor 13 can be kept clean. To load the trucks, the racks most remote from the rear of the truck are lowered and are loaded with meats which are usually not maintained in wrappings but laid directly on the racks. The loader then lowers the next adjacent set of racks and begins loading those and so on until the entire truck has been filled with the meats.

Installing non-corroding metal racks in meat trucks is justified because of government inspection, which if an inspector finds the floor of a truck to be untidy or unsanitary, requires rejection of the entire truckload of meats.

It is evident that wooden floors are difficult to maintain in a clean condition and if clean, they may not have the appearance of such, whereas a metal rack made of stainless steel, for example, can be cleaned to a bright surface and any impurities or foreign substances deposited on such surfaces are readily detected.

Although one embodiment of the invention has been herein illustrated and described, it will be evident to those skilled in the art that various modifications may be made in the details of construction without departing from the principles herein set forth.

I claim:

1. A bed for trucks comprising a floor having a sheet metal surface and having floor racks consisting of slotted metal sections in side by side and end to end relation to cover the entire floor of the truck, said panel sections having flanged sides and V grooves of substantially the same depth as said flanged sides constituting chairs for said panels and inverted channels of the height of the flanges of said panel sections secured to the floor of the truck against the side walls thereof to space said sections from said walls, said panel sections being hinged to said inverted channels.

2. A bed for trucks comprising a floor having a sheet metal surface and having racks consisting of slotted sheet metal panel sections in side-by-side and end-to-end relation to cover the entire floor of the truck, said panel sections having V grooves pressed into the top surface thereof and having side flanges of substantially the same depth as said V grooves for spacing the racks from the floor of the truck, and inverted channels of the height of the flanges of said panel sections secured to the floor of the truck against the side walls thereof to space said sections from said walls, said panel sections being hinged to said inverted channels.

References Cited in the file of this patent

UNITED STATES PATENTS

| | | |
|---|---|---|
| 928,406 | Strain | July 20, 1909 |
| 2,107,853 | Coffey | Feb. 8, 1938 |
| 2,226,042 | Zane | Dec. 24, 1940 |
| 2,657,088 | Clement | Oct. 27, 1953 |
| 2,683,427 | Blanning | July 13, 1954 |